(12) United States Patent
Schott et al.

(10) Patent No.: US 8,856,880 B2
(45) Date of Patent: Oct. 7, 2014

(54) METHOD FOR PROVIDING SUBSCRIPTIONS TO PACKET-SWITCHED NETWORKS

(75) Inventors: Markus Schott, München (DE); Jiadong Shen, München (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 848 days.

(21) Appl. No.: 12/532,615

(22) PCT Filed: Mar. 19, 2008

(86) PCT No.: PCT/EP2008/053273
§ 371 (c)(1),
(2), (4) Date: Mar. 26, 2010

(87) PCT Pub. No.: WO2008/116804
PCT Pub. Date: Oct. 2, 2008

(65) Prior Publication Data
US 2010/0199330 A1 Aug. 5, 2010

(30) Foreign Application Priority Data
Mar. 23, 2007 (EP) .................... 07006100

(51) Int. Cl.
*H04L 29/06* (2006.01)
(52) U.S. Cl.
CPC ......... *H04L 65/1073* (2013.01); *H04L 65/1016* (2013.01)
USPC .................................. 726/4; 726/8
(58) Field of Classification Search
CPC .............. H04L 63/306; H04L 65/1073; H04L 65/1016
USPC ............................................ 726/4, 8; 725/25
See application file for complete search history.

(56) References Cited

U.S. PATENT DOCUMENTS

2002/0141358 A1 10/2002 Requena
2002/0196775 A1 12/2002 Tuohino et al.
(Continued)

OTHER PUBLICATIONS

Yan, "Standard for a Next Generation Service Overlay Network", Apr. 2011, IEEE, p. 9-135.*

(Continued)

*Primary Examiner* — Mahfuzur Rahman
*Assistant Examiner* — Gregory Lane
(74) *Attorney, Agent, or Firm* — Laurence A. Greenberg; Werner H. Stemer; Ralph E. Locher

(57) ABSTRACT

Method for providing a subscription to an IP-based Multimedia Subsystem (IMS) for a first client of a packet-switched network is provided. The first client is identified by the same MSISDN number as a second, mobile client of a circuit-switched network. The method comprises the following steps: a) sending, by the first client, a register request to an IMS Server via the packet-switched network, b) sending, by the IMS server, a location query request to a register for the IMS user identities (HSS), c) requesting, by the register for the IMS user identities (HSS), the user subscription information of the circuit-switched network from the register for the circuit-switched network (HLR), d) sending, by the register for the circuit-switched network (HLR), to the register for the IMS user identities, the user subscription information of the second client, e) creating, by the register for the IMS user identities (HSS), a user IMS subscription information based on user subscription information of the second client.

11 Claims, 4 Drawing Sheets

(56) References Cited

U.S. PATENT DOCUMENTS

| | | | |
|---|---|---|---|
| 2003/0159067 A1* | 8/2003 | Stirbu | 713/201 |
| 2004/0137900 A1 | 7/2004 | Varonen et al. | |
| 2006/0084431 A1* | 4/2006 | Hua et al. | 455/433 |
| 2006/0136557 A1* | 6/2006 | Schaedler et al. | 709/203 |
| 2007/0043947 A1* | 2/2007 | Mizikovsky et al. | 713/172 |
| 2007/0113086 A1* | 5/2007 | Huang et al. | 713/168 |
| 2007/0124438 A1* | 5/2007 | Park et al. | 709/223 |
| 2007/0133782 A1* | 6/2007 | Zhu | 379/265.09 |
| 2007/0174443 A1* | 7/2007 | Shaheen et al. | 709/223 |
| 2007/0192486 A1* | 8/2007 | Wilson et al. | 709/225 |
| 2007/0195754 A1* | 8/2007 | Shaheen | 370/352 |
| 2007/0220092 A1* | 9/2007 | Heitzeberg et al. | 709/204 |
| 2009/0235299 A1* | 9/2009 | Astrom et al. | 725/25 |
| 2012/0257756 A1* | 10/2012 | Huang et al. | 380/281 |

OTHER PUBLICATIONS

Report on Alternative Architectures for Combining CS Bearers with IMS, WP002320984, Dec. 13, 2004.

* cited by examiner

METHOD FOR PROVIDING SUBSCRIPTIONS TO PACKET-SWITCHED NETWORKS

CLAIM FOR PRIORITY

This application is a 371 national stage application of PCT/EP2008/053273, filed Mar. 19, 2008, which claims priority to EP 07006100.7, filed Mar. 23, 2007, the contents of which are hereby incorporated by reference.

TECHNICAL FIELD OF THE INVENTION

The invention relates to a method for providing subscriptions to packet-switched networks.

BACKGROUND OF THE INVENTION

Dual mode mobile phones enable telephony connections by circuit-switched networks like GSM or by packet-switched network like a WLAN internet access. A user using the WLAN internet access may wish to access value-added services like location based services, download of ring tones and voicemail. To enable such services the IMS (IP Multimedia Subsystem) is introduced as an architectural framework for delivering IP multimedia services to end-users. IMS is used for evolving mobile networks beyond GSM and enables third party providers an easy integration of their services.

The Mobile, Fixed, Fixed Mobile Convergence operators start to extend their service offers with services provided via this IP-based Multimedia Subsystem (IMS) defined in 3GPP (3rd Generation Partnership Project) and TISPAN (Telecoms R. Internet converged Services Protocols for Advanced Networks Standards). U.S. Pat. No. 6,859,651 shows an exemplary IMS system and how a client registers to the IMS system.

For a user that uses the IMS system for the first time, provisioning of the IMS user data requires a significant effort. This slows down the introduction of new services.

SUMMARY OF THE INVENTION

The invention provides the introduction of new services and an IMS server that enables a faster introduction of new services.

In one embodiment of the invention, a method for providing a subscription to an IP-based Multimedia Subsystem (IMS) for a first client of a packet-switched network. The first client is identified by the same MSIDSN number as a second, mobile client of a circuit-switched network, like a GSM network.

In another embodiment of the invention, the first client sends a register request to an IMS Server via the packet-switched network. The IMS server sends a location query request to a register for the IMS user identities (HSS), which requests the user subscription information of the circuit-switched network from the register for the circuit-switched network (HER).

In still another embodiment of the invention, the register for the circuit-switched network (HLR) sends the user subscription information of the second client to the register for the IMS user identities. A user IMS subscription information based on user subscription information of the second client is generated by the register for the IMS user identities (HSS).

In yet another embodiment of the invention, before a subscriber can use any IMS-enabled service, the Home Subscriber Server (HSS) respectively User Profile Server Function (UPSF), being the central logical database for subscriber data in 3GPP and TISPAN networks, is provisioned with additional subscriber-related information. This additional information is e.g. the IMS Private User Identity and IMS Public Identity that are used in the IMS for identification and addressing purposes.

The exemplary method provides an easier generation of IMS subscriber-related information. If a user starts the new IMS service for the first time with the first client, the self-providing of the user information makes it easier to provide the IMS user identities of the user. The register for the IMS services requests the user identities from the circuit-switched network register.

In one aspect of the invention, the HSS creates, on the fly, a IMS subscription entry in its database during the first registration attempt of the IMS user. In prior art IMS networks such a request would be rejected. Rather, in prior art IMS networks, an operator has to generate the IMS subscription before the first registration. This requires an additional manual step. The providing step for this additional information increases the administration costs of an operator and impedes the fast introduction of new services. It is not required that the first and second client are both connected to their respective networks at the time of the first registration to the IMS network. Accordingly, parallel IP access and CS coverage is not necessary.

Additionally, the circuit-switched subscription and the IMS subscription do not need to be run by the same operator. Of course, the two operators typically have an agreement for an interaction between the HSS of IMS System and the HLR of the CS domain, e.g. a use case is that a subscriber gets a new mobile, which is Dual Mobile Handset (DMH).

In another aspect of the invention, after the generation of the IMS user identities, the register for the IMS user identities sends the authorization information to the IMS server and IMS server sends the authorization data to the first client. The first client now has the possibility to generate necessary data, e.g. username and password, for later authorization in the IMS network. This step ensures that the first client can receive and store the user data automatically. No additional manual steps for generating the authentication and authorization data are required from the user of the first client.

In one embodiment, the IMPU is changed to another value when creating the IMS user subscription information. The new IMPU is based on the MSISDN because the IMSI-based number should not be used in the authentication and authorization procedures for security reasons.

In another embodiment, if the register request from the first client to the IMS server includes an IP Multimedia Private Identity (IMPI) and a temporary IP Multimedia Public Identity (IMPU) which is generated from the IMSI of the second client, this request is based on the information already stored in the second client. These IMS identities enable to find the link between the HSS user identity to be generated and the already existing HLR user information. If first and second client are part of the same device or connected e.g. by a Bluetooth connection, the IMPI and the temporary IMPU may also be generated automatically.

Preferably, after creation of the user identity of the IMS network, the authentication of the first client is done according to the IMS Authentication and Authorization (AKA) Agreement procedures. The AKA is a challenge-response based mechanism and uses symmetric cryptography. This mechanism ensures a secure communication between the first client and the IMS. If the first client and the second, mobile client are part of the same device, this device may roam from the circuit-switched network to the packet-switched network without switching on and off the device.

In yet another embodiment of the invention, an existing operator's customer who is interested to use a new service gets a user equipment (UE) that is capable to provide the new service, and starts using it. At maximum, it should be required to perform some simple steps to configure the UE (user equipment). The above-described method requires that the user is already subscribed to the circuit-switched network and that a user identity exists in the register of the circuit-switched network. The information about this user identity is reused by the register for the IMS identities.

Another embodiment of the invention relates to a server for storing user identities of an IMS network. The server includes a register unit, a receiver unit, a transfer unit and a creation unit. The register unit stores user identities for the IMS (IP Multimedia Subnet) network and the receiver unit receives requests for an IMS user data. The transfer unit requests the user data of a circuit-switched network from a register for user identities for circuit-switched networks (HLR), in case the receiving unit receives a request for an IMS user identity that is not stored in the register unit. The creation unit generates the user identity for the IMS network based on the user data received from the register for the circuit-switched network (HLR).

In one aspect of the invention, the server enables self-providing of the user identities if a user accesses the IMS service for the first time. This eases the introduction of new services because new users can be registered without additional manual effort. It is further advantageous that it is not required to change the data structures of the user identities for IMS and CS. The prior art data structures may be reused.

This above-described method and server are also advantageous compared to methods in which the register for the IMS user identity gets its information from the access network, whereby the access network is a network like a WLAN to which the first client is logged first. In contrast, no interaction between IP access network and the register for IMS user identities (HSS) is necessary which means that no transfer of the access network (AN) identifier (MSISDN, IP address) to the HSS is needed.

In the invention, the register for IMS user identities (HSS) will get information from the CS/PS subscription for the self-providing, instead from the access network. The user can use both CS voice service and VoIP (Voice-over-IP) service via IMS, together with the CS/IMS roaming and handover mobility service. The first client may request to the registration when not being connected to the circuit-switched network.

BRIEF DESCRIPTION OF ME DRAWINGS

The invention will be best understood from the following description of specific embodiments when being read in conjunction with the accompanying exemplary drawings.

DETAILED DESCRIPTION OF THE INVENTION

Figure 1:
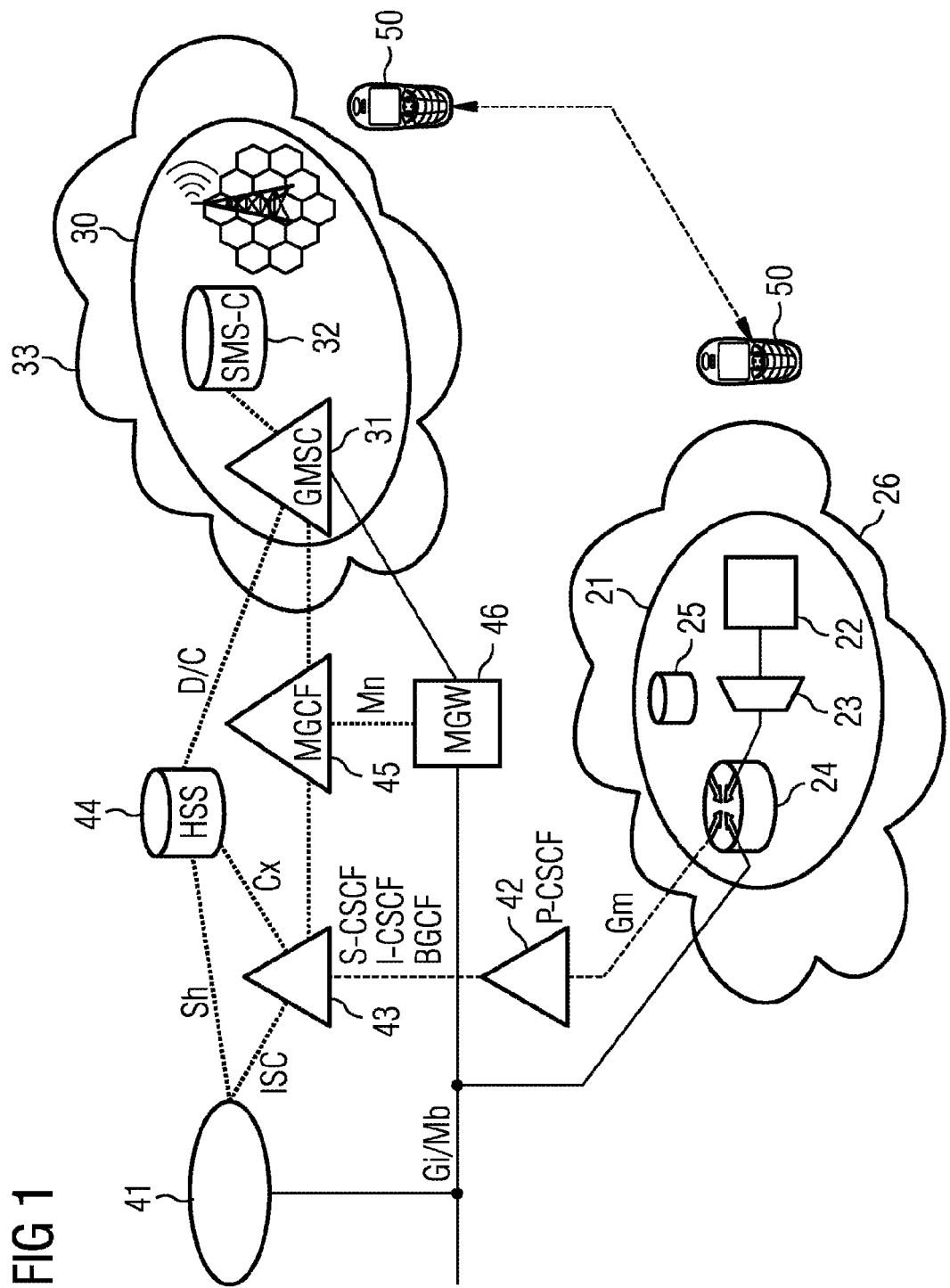
FIG. 1 shows an embodiment of a plurality of networks in which the inventive method may be implemented.

FIG. 1 shows a schematic of a plurality of networks. The access network 21 is a fixed network which comprises an WLAN (Wireless Local Area Network) hotspot 22, which is connected to an DSLAM 23 (Digital Subscriber Line Access Multiplexer) which links many DSL connections to e.g. an ATM connection. The DSLAM 23 is connected to the access router 24. The access network 21 further comprises a server 25 for the AAA (authentication, authorization and accounting) that controls what computer resources users have access to and keeps track of the activity of users over a network. The access network 21 is run by a first service provider that is called the operator 1. He is connected to the access network 21 by the operator network 26. The access network 21 is a packet-switched network e.g. based on Internet Protocols.

A second network 30 is the circuit-switched mobile telephony network, in this case a 2G (Second Generation) or 3G (Third Generation) mobile network, e.g. a GSM (Global Mobile System) or an UMTS network. The second network 30 comprises an GMSC 31 (Gateway Mobile Service Switching Centre) which is the connection point between the second network 32 and other networks like PSTN and PMLN. The second network further includes a SMSC 32 (Short Message Service Centre), which delivers SMS messages. The operator of the second network 30 is called operator 2 and is connected via a network 33 to the second network 30.

The third network comprises a plurality of IMS servers and proxies. The IMS application servers 41 provide value-added services like providing weather forecasts, ring tones or videos. The IMS network further comprise a proxy-CSCF (P-CSCF) 42, a server 43 for the Serving CSCF (S-CSCF), the Interrogating CSCF (I-CSCF) functions and an HSS (Home Subscriber Server) register 44. The HSS register 44 stores the user IMS subscription data that is specific for each user of the IMS network. Connection between the IMS network and the second network 30 is provided by a MGCF (Media Gateway Controller Function) server 45 and a MGW (Media Gateway) server 46.

In FIG. 1, the Sh, ICS, Cx, Mn, Mb and Gi interfaces between the IMS servers 41, 42, 43, 44, and 45 and the GMSC server 31 are marked according to the 3PGG standards. The services of the IMS network are described in further detail in the especially in the following 3PGG references:

3GPP TS 29.228: "IP Multimedia (IM) Subsystem Cx and Dx interfaces Signalling flows and message contents"

3GPP TS 29.229: "Cx and Dx interfaces based on the Diameter protocol; Protocol details"

3GPP TS 23.002: "Technical Specification Group Services and Systems Aspects; Network architecture (Release 6)"

3GPP TS 23.003: "Technical Specification Group Core Network and Terminals; Numbering, addressing and identification (Release 6)"

3GPP TS 228

3GPP TS 24.229

3GPP TS 33.203

A user utilizes a dual mode mobile phone 50 to build connections to the networks. The dual mode mobile phone 50 incorporates two clients although being just one device. One of these clients is a mobile phone that connects to a circuit-switched mobile telephony network like GSM or UMTS. The other client is a phone that builds connections to the wireless network and that enables Voice-over-IP calls via the WLAN hotspot 22. The dual mode mobile phone 50 may roam between the access network 21 and the second network 30. If both networks 21 and 30 are available, the user may decide which one to use. When changing between the networks 21 and 33, a handover of the calls has to take place.

The user may want to have access to the values-added services independently of the network to which he is currently connected. If he booked IMS services at the operator 1, the user identities have to be generated before he actually can access the IMS services.

Figure 2:
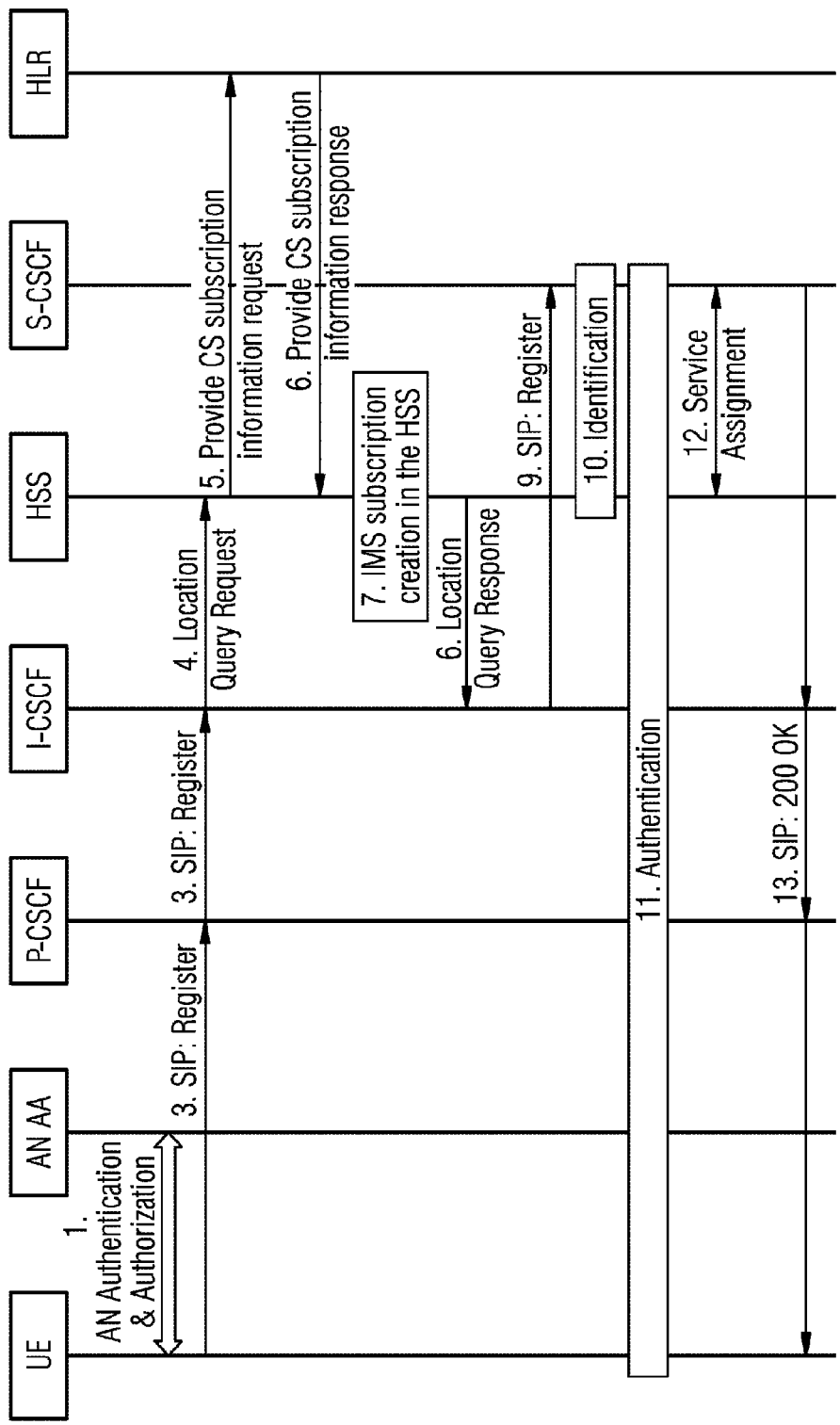
FIG. 2 shows a flow for a registration of a client to an IP Multimedia Subsystem (IMS).

FIG. 2 shows steps for a registration of a client to the IF Multimedia Subsystem. In Step 1, the user equipment (UE), in this case the dual mode mobile phone 50, request an Authentication and Authorization at the AN (access network 21). The UE is authenticated by an Authentication and Authorization function (AA) of the AN through any mechanism, and is authorized to establish an IP Connectivity with the P-CSCF. The authentication is done based on an AN user identifier, whose details depend on the AN and the authentication mechanism. Here it is not required that the access network shall have any interaction with the IMS System. The access network provides just an access to the Proxy CSCF 42 via the access router 24.

According to step 2, the UE sends the command "SIP: Register" to the P-CSCF 42. The UE then shall use IMS AKA to register with IMS System, where it uses the IMPU and IMPI derived from its IMSI of the CS/PS subscription for the IMS registration. Besides the identities for normal 3GPP networks IMSI (International Mobile Subscriber Identity), TMSI (Temporary Subscriber Identity), IMEI (International Mobile Equipment Identity) and MSISDN (Mobile Subscriber ISDN Number), the IMS uses the additional identities IP Multimedia Private Identity (IMPI) and IP Multimedia Public Identity (IMPU). The DMH has a SIM card for the CS access and can access this SIM card to derive the IMPU and IMPI according to 3GPP 23.003. The IMPU is a temporary identify which will be changed in further steps of this method.

A subscriber that has currently CS/PS subscription with (U) SIM and the IMS application on its UE uses IMS AKA for IMS authentication, using temporary IMPI and IMPU based on IMSI.

In step 3, the P-CSCF forwards the information received with the SIP REGISTER request to the I-CSCF role. Whether the information is conveyed by really forwarding the SIP message or by other means, is irrelevant. For instance, if the I-CSCF role is co-located with the P-CSCF role on the same Server, the I-CSCF could access the data via an internal data structure.

The I-CSCF queries, in step 4, the HSS for information in order to locate the S-CSCF. The request includes, in particular, the public user identity received in the REGISTER request. It may include the private user identity, if received with the Register request. Whether the location query request and response is implemented according to the 3GPP specifications TS 29.228 and TS 29.229 or not, is not relevant.

According to step 5, the HSS sends a "Provide CS Subscription Information Request" to the HLR. The HSS first checks whether it has a user profile for the user. If it is not the case, it tries to get CS information from the HLR of the user. The HSS can use the IMSI embedded in the derived IMPU and IMPI to issue such a request. For this invention it is not relevant whether the HSS and HLR are co-located or not and which kind of interface (Standard or proprietary, internal or external) is used for such a communication. But it is important that at least the HSS can retrieve information from the HLR, which is necessary for the IMS system. This information is e.g. the MSISDN and an authorization vector.

The HSS is provided with the "Provide CS Subscription Information Response" by the HLR in step 6. The HLR sends user data of the circuit-switched network to the HSS. Note that, prior to this step, the HLR may check the internal policy whether it is allowed to provide the information to the HSS.

In step 7, the HSS creates the IMS Subscription. After receiving the necessary information from the HLR, the HSS creates a temporary IMS subscription for the IMPU and IMPI pair used for the registration. Since the temporary IMPU of step 2 was derived from the IMSI and should not be used for IMS Services, an MSISDN based IMPU is created for the user and will be registered implicitly. And this MSISDN based IMPU will be used for IMS services. In this figure, the HSS contains only the IMS subscription. Of course, according to the 3GPP TS 23.002, a HSS contains the complete subscription.

An end-user is normally unaware of the IMPU and IMPI derived from the IMSI. He respectively she only knows the MSISDN for CS Services. With this method, it can still use the MSISDN for IMS Services. e.g. the VCC (Voice Call Continuity) service. The VCC ensures that a call is not interrupted when moving from a CS cell to the WEAN access. But it is also possible that the HSS assigns other IMPU's to the IMS subscription.

In step 8, the HSS sends a Location Query Response to the I-CSCF. The HSS sends a positive response that either contains the address of the S-SCCF assigned to that user or other information that allows the I-CSCF to locate an S-CSCF. This other information leads to an S-CSCF that includes the user information.

The I-CSCF sends the command "SIP: Register" to S-CSCF according to step 9. The I-CSCF forwards the information received with the SIP REGISTER request to the S-CSCF role. Whether the information is conveyed by really forwarding the SIP message or by other means, is irrelevant. For instance, if the S-CSCF role is co-located with the I-CSCF role on the same server, the I-CSCF could access the data via an internal data structure.

In step 10, the S-CSCF sends the "Identification" information to the HSS. The S-CSCF gets the information from the HSS for a proper authentication. Since no IMS secrete is shared between the UE and IMS, the CS secrete shared between the UE and the CS domain (HLR) is reused. Thus the authorization vector received from the HLR is provided to S-CSCF for the IMS AKA authentication procedure.

Step 11 is the "Authentication" procedure that is run between the UE and the S-CSCF according to Digest AKA (RFC 3310) and to 3GPP 33.203. The invention also provides the combination of self-providing and the use of IMS AKA for authentication.

Step 12 describes the "Service Assignment" between the S-CSCF and the HSS. After a successful authentication, the S-CSCF re-quests the service profiles and the list of all public user identities associated with the registration (the so-called implicitly registered public user identities) from the HSS. At this moment the HSS can treat the temporary user profile as a confirmed user profile and the user will get IMS Services. The HSS shall store the S-CSCF name for the user.

The "SIP: 200 OK" message is sent from the S-CSCF via the I-CSCF and the P-CSCF to the UE in step 13. The S-CSCF acknowledges the registration attempt. The implicitly registered pub-lie user identities are conveyed to the UE in the P-Associated-URI header.

Figure 3:
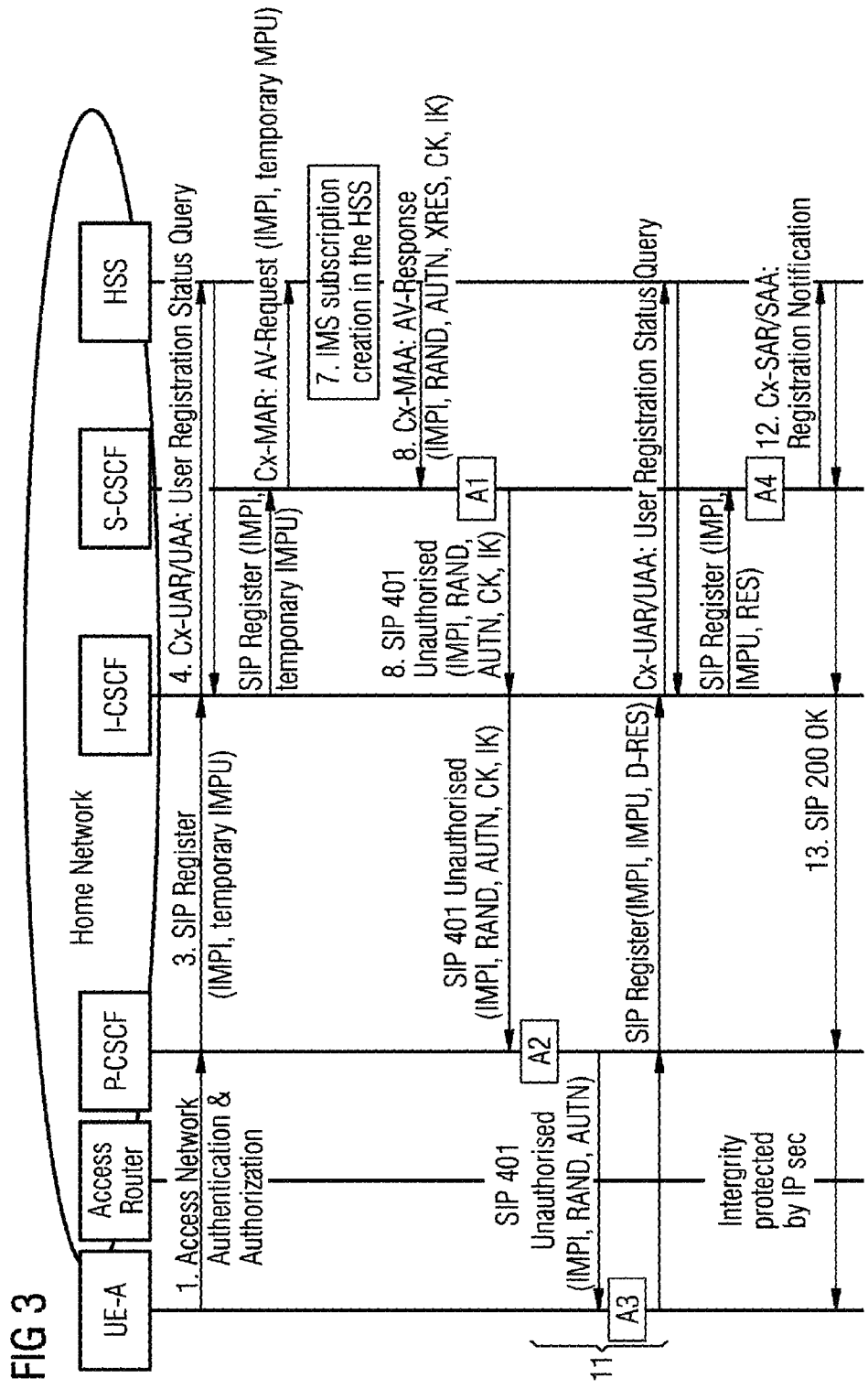
FIG. 3 shows an embodiment of the message flow shown in FIG. 2.
Figure 4:
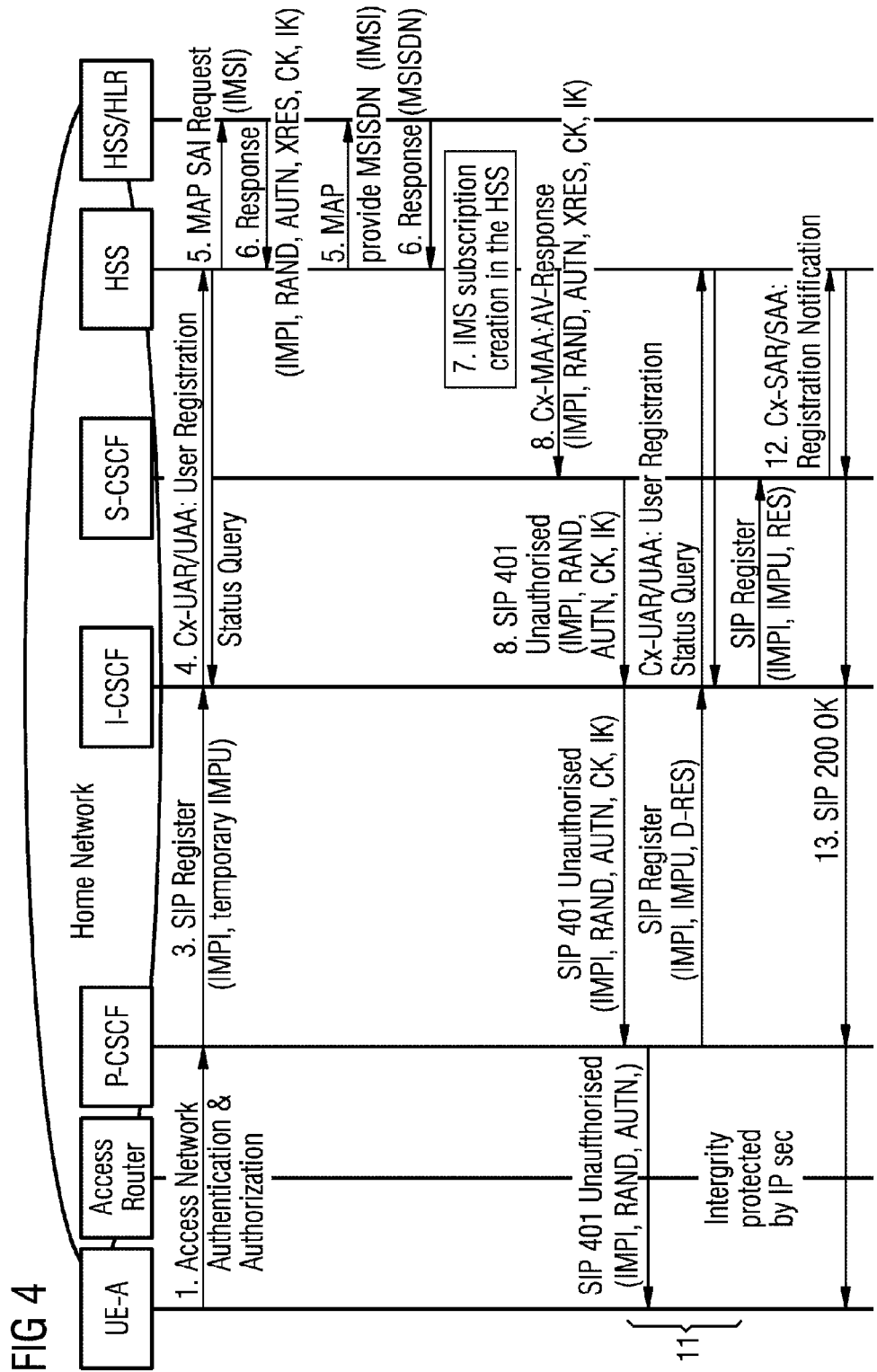
FIG. 4 shows a another embodiment for the message flow shown in FIG. 2.

FIGS. 3 and 4 show message flows of the method according to FIG. 2. These examples show that the described method can be realized based on existing procedure but reduces the effort for the introduction of new services.

FIG. 3 shows an access independent IMS AKA function for the case when CS/PS subscription is hold on the HSS that also stores the user identities.

In this example, the messages of the steps listed in FIG. 2 are mapped into Cx messages according to the DIAMETER protocol, SIP (Session Initiation Protocol) messages and MAP (Mobile Application Part) messages.

In the embodiment, the UE has been pre-provisioned with all configuration data that enables to register with the IMS. Details how this UE pre-providing is done e.g. by manual or automated means may be chosen by a skilled in the art. The set of configuration data includes, at least, the IMS domain name, a domain name or IP address to access the P-CSCF, and an IMS public user identity that is used for registration with the IMS.

If an authentication procedure is run between the UE and the IMS, the UE needs also to know its IMS private user identity (that is used as "username" in the authentication process) and the secrets (which is a "password" in the simplest case) required to run the authentication.

In this scenario, a subscriber has an existing CS/PS subscription. The subscriber gets a new DMH for CS/IMS roaming and handover with CS and/or WLAN coverage. The subscriber is be reachable in the IMS and in the CS domain with the same E.164 number and may roam between the two domains. If the user is equipped with a Dual Mode Handheld (DMH), he can also hand-over active sessions from one domain to the other, and receive and send short messages even while roaming solely in the IMS.

At the beginning, the subscriber has no IMS subscription data in the HSS/UPSF. This is why the method for self-providing of the user data is performed.

In step 3, the SIP: Register request comprises as arguments the IMPI and the temporary IMPU which is derived from the IMSI of the SIM card. These identifiers are further used for the steps 4 and 5. These identifiers are generated by the UE before step 3.

An IMS Public User Identity (IMPI) is not built like a phone number but a URI that may be digits or alphanumeric identifiers. Based on the 3GPP TS 23.003, the UE constructs the IMS Public User Identity from the IMSI stored in the SIM or USIM, according to the following rule:

The IMS Public User Identity is sip: [imsi] @ims .mnc [mnc] .mcc[mcc] .3gppnetwork.org whereby [imsi] is the IMSI value,

[mnc] is the mobile network code derived from the IMSI and filled on the left with "0" digits to yield a 3-digit number, and [mcc] is the mobile country code.

The Private User Identity is accordingly: [imsi] {fourth root}ims .mnc [mnc] .mcc[mcc] .3gppnetwork.org Example for the public user identity with IMSI=234150999999999 is sip: 234150999999999i?ims.mncOlS.mcc234.Sgppnetwork.org In step 4, the I-CSCE first requests from the HSS information about the location of the responsible S-CSCF, before the SIP Register request is sent to this S-CSCE and from there to the HSS. The HSS is on a server that includes both the HSS register 44 and the HLR of the circuit-switched network. Accordingly, the communication between HSS and HLR takes place in this server internally.

In step 8, the HSS sends back the parameters RAND, AUTN, XRES, CK and IK, which are used in the authentication according to the RCF 3310 standard. After step 8, which is indicated by the "A1" in FIG. 3, the expected response XRES is stored.

At point A3 the parameters CK and IK are stored in the P-CSCF and the parameters RAND and AUTN are forwarded to the User equipment. At point A3 the responses RES, XAUTN, CK and IK are computed and it is checked if AUTN equals XAUTN for the network authentication. After this calculation the connections between the UE and the IMS will be protected by IP secure. During the authentication procedure, in step 11, the S-CDCF checks at point A4, if D-RES equals D-XRES to authenticate the user.

FIG. 4 shows access independent IMS AKA function with CS/PS subscription is held on a separate physical entity, meaning that the HSS entity includes the IMS subscription and the HSS/HLR includes the CS/PS subscription. The communication between the HSS and the HLR is based on MAP messages.

The HSS register 44 needs additional features compared to the prior art. The HSS register 44 is constructed in a way that it checks, if it includes a user identity. If not, it sends a request to the HLR to get the necessary information. Based on this information, it creates the IMS subscription and stores it accordingly.

Abbreviations employed:
3GPP 3rd Generation Partnership Project
AA Authentication and Authorization AKA Authentication and Key Agreement
AN Access Network
CCC Customer Care Centre
CS Circuit-switched
DMH Dual Mode Handset GSM Global System for Mobile Communications
GMSC Gateway Mobile Switching Centre
HSS Home Subscriber Server
I-CSCF Interrogating Call Session Control Function
IMPI IMS Private User Identity IMPU IMS Public User Identity
IMS IP-based Multimedia Subsystem
IMSI International Mobile Subscriber Identity
IP Internet Protocol
MAA Multimedia Authentication Answer MAP mobile application part
MAR Multimedia Authentication Request
MSRN Mobile Station Roaming Number
MSC mobile service switching centre
MSISDN Mobile Station International PSTN/ISDN Number P-CSCF Proxy Call Session Control Function
PoC Push to Talk over Cellular
PSTN Public switched telephone network
PLMN Public land mobile network
PS Packet-switched S-CSCF Serving Call Session Control Function
SAA Server Assignment Answer
SAR Server Assignment Request
SIM Subscriber Identity Module
SIP Session Initiation Protocol UAA User Authorization Answer
UAR User Authorization Request
UE User Equipment
UMTS Universal Mobile Telecommunication System
URI Uniform Resource Identifier
UMTS Universal Mobile Telecommunications System
USIM Universal Subscriber Identity Module
WLAN Wireless Local Area Network

REFERENCE NUMBER LIST

21 access network
22 WLAN hotspot
23 DSLAM
24 Access router
25 AAA
26 operator network
30 CS network
31 GMSC
32 SMSC server
33 operator network
41 IMS application servers 42 P-CSCF
43 server
44 HSS
45 MGFC
46 MGW
50 Dual mode mobile phone

The invention claimed is:

1. A method for providing a subscription to an IP Internet-Protocol based Multimedia Subsystem (IMS) for a first client of a packet-switched network, the method comprising:
 a) identifying the first client by a Mobile Subscriber Integrated Services Digital Network (MSISDN) number, and identifying a second, mobile client of a circuit-switched network by a MSISDN number that is identical to the MSISDN number identifying the first client;
 b) sending, by the first client, a register request to an IMS Server via the packet-switched network;
 c) sending, by the IMS server, a location query request to a Home Subscriber Server (HSS) register;
 d) requesting, by the HSS register, user subscription information of the circuit-switched network from a Home Location Register (HLR) of the circuit switched network;
 e) sending, by the HLR of the circuit-switched network, to the HSS register, the user subscription information of the second client; and
 f) creating, by the HSS register, a user IMS subscription information based on the user subscription information received in step e).

2. The method according to claim 1, wherein the method further comprises:
 f) sending, by the HSS register, authorization information to the IMS server; and
 g) sending, by the IMS server, an authorization challenge to the first client.

3. The method according to claim 1, wherein in step b) the request includes a Internet-Protocol Multimedia Private Identity (IMPI) and a temporary Internet-Protocol Multimedia Public Identity (IMPU) which is generated from an International Mobile Subscriber Identity (IMSI) of the second client.

4. The method according to claim 3, wherein in step e) a new Internet-Protocol Multimedia Public Identity (IMPU) is generated based on the MSISDN of the first client and the second client.

5. The method according to claim 1, wherein in step a) the request is sent to a Proxy Call Session Control Function (CSCF) and in step b) the location query request is sent by an Interrogation Call Session Control Function (CSCF).

6. The method according to claim 1, wherein the circuit-switched network is an wireless telephony network.

7. The method according to claim 1, wherein the first client and the second client are incorporated in one device.

8. The method according to claim 1, wherein, after creation of the user identity of the IMS network, the authentication of the first client is done according to an IMS Authentication and Authorization (AKA) Agreement procedures.

9. A server for storing user identities of an Internet-Protocol Multimedia Subsystem (IMS) network, the server comprising: a Home Subscriber Server (HSS) register for storing IMS user identities for an IMS network;
 a receiver unit for receiving requests for IMS user identities;
 a transfer unit that requests user data of an circuit-switched network from a Home Location Register (HLR) of the circuit-switched network, if the receiver unit receives an request for an IMS user identity that is not stored in the HSS register; and
 a creation unit to generate the IMS user identity based on the user data received from the HLR of the circuit-switched network.

10. The server according to claim 9, wherein the creation unit generates a new Internet-Protocol Multimedia Public Identity (IMPU) based on a Mobile Subscriber Integrated Services Digital Network (MSISDN) number of the first client and a MSISDN number of a second client.

11. The server according to claim 9, further comprising a sender unit which sends the IMS user identity, which was generated by the creation unit, to an IMS server.

* * * * *